J. WHITE.

GLOBE-HOLDER.

No. 7,286. Reissued Aug. 29, 1876.

Witnesses

Saml. J. Van Stavoren

Jos. R. Connolly

By

Inventor

Joseph White,

Connolly Bros, Attorneys

N. PETERS, PHOTO-LITHOGRAPHER, WASHINGTON, D. C.

UNITED STATES PATENT OFFICE.

JOSEPH WHITE, OF PHILADELPHIA, PENNSYLVANIA.

IMPROVEMENT IN GLOBE-HOLDERS.

Specification forming part of Letters Patent No. 162,731, dated April 27, 1875; reissue No. 7,286, dated August 29, 1876; application filed July 11, 1876.

*To all whom it may concern:*

Be it known that I, JOSEPH WHITE, of Philadelphia, in the county of Philadelphia and State of Pennsylvania, one of the United States of America, have invented an Improvement in Globe-Holders, of which the following is a specification, reference being had to the accompanying drawing, forming part of this specification, wherein—

Figure 1:
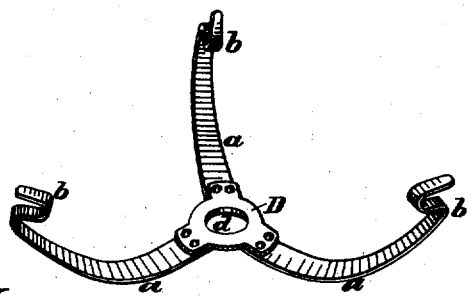
Figure 2:
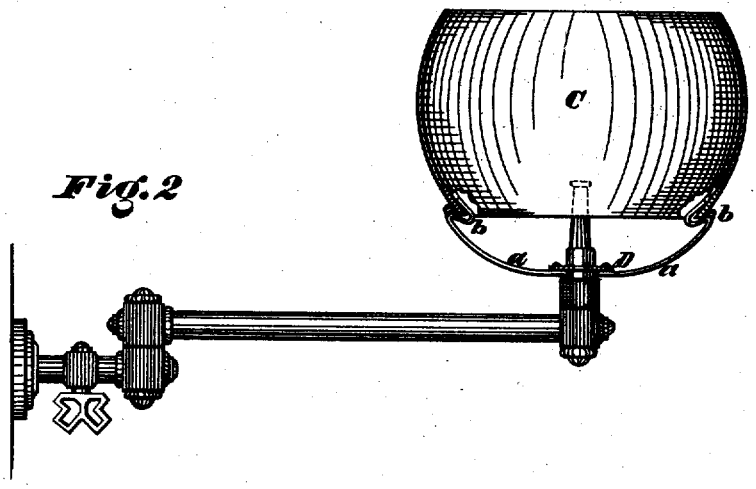

Figure 1 is a perspective of my improved globe-holder, and Fig. 2 is a side elevation of same applied to a burner and globe.

My invention has for its object to provide an elastic support or holder for globes or glass shades for gas-burners, the same being designed as an improved substitute for the rigid holders with retaining-screws heretofore employed.

My invention accordingly consists, broadly, of a globe or gas-shade holder or support formed with spring or elastic arms, terminating in hooks or catches, for embracing the lower edge or flange around the neck or lower opening of the globe or gas-shade.

Referring to the accompanying drawing, *a a a* are arms, formed of spring-brass or equivalent material, and made with curved or bent ends *b b b*, serving as hooks, catches, or seats for the globe C. These arms are to be fastened to the burner in any suitable manner, as by riveting to a disk, D, having a central aperture, *d*, through which said burner passes. The globe is fastened in the holder by springing the arms, so that the lower edge or flange of the said globe will find a seat in the hooks or curved ends of said arms.

The elastic force of the arms serves to clamp the flange or lower edge of the globe, retaining the latter firmly and securely in position till its removal is desired, said removal being accomplished by a simple upward or lateral pull of sufficient force to overcome the elastic power of the arms.

It will be thus seen that a globe may be inserted in and withdrawn from a holder of this improved construction much more readily and easily than in or from the ordinary rigid holder with retaining-screw.

By making the arms *a a a* in separate pieces and afterward securing them in position, as already described, they may be manufactured with but slight or no waste; whereas, if they and the disk or hub D, or an equivalent center, were all formed in one piece, considerable loss of material would be incurred.

A great advantage in this improved holder, aside from its simplicity, efficiency, and slight cost, consists in the fact that it permits the expansion of the globe from heat without producing breakage. Where rigid arms are employed, and the globe is screwed in fast in the usual manner, a fracture is likely to occur as soon as the heat from the lighted gas produces an expansion of the glass; but with my improved holder no such accident is likely to occur, or even possible, as the spring-arms give sufficiently to compensate for the expansion of the glass, without, however, releasing their hold on the latter.

What I claim as my invention is—

1. A globe-holder having spring or elastic arms *a a a*, made with curved or bent ends *b b b*, forming hooks or catches for embracing the lower edge or flange around the lower opening of the globe.

2. The improved globe-holder herein described, consisting of the disk or center D, having aperture *d* for the passage of a gas-burner, and spring or elastic arms *a a a*, terminating in hooked or curved ends for the purpose, substantially as set forth.

In testimony that I claim the foregoing I have hereto set my hand this 8th day of July, A. D. 1876.

JOSEPH WHITE.

Witnesses:

CHAS. F. VAN HORN,

T. A. CONNOLLY.